May 31, 1960  J. A. MORRISON  2,938,683
POWER CONTROL MECHANISM FOR JET POWERED AIRCRAFT
Filed June 6, 1955
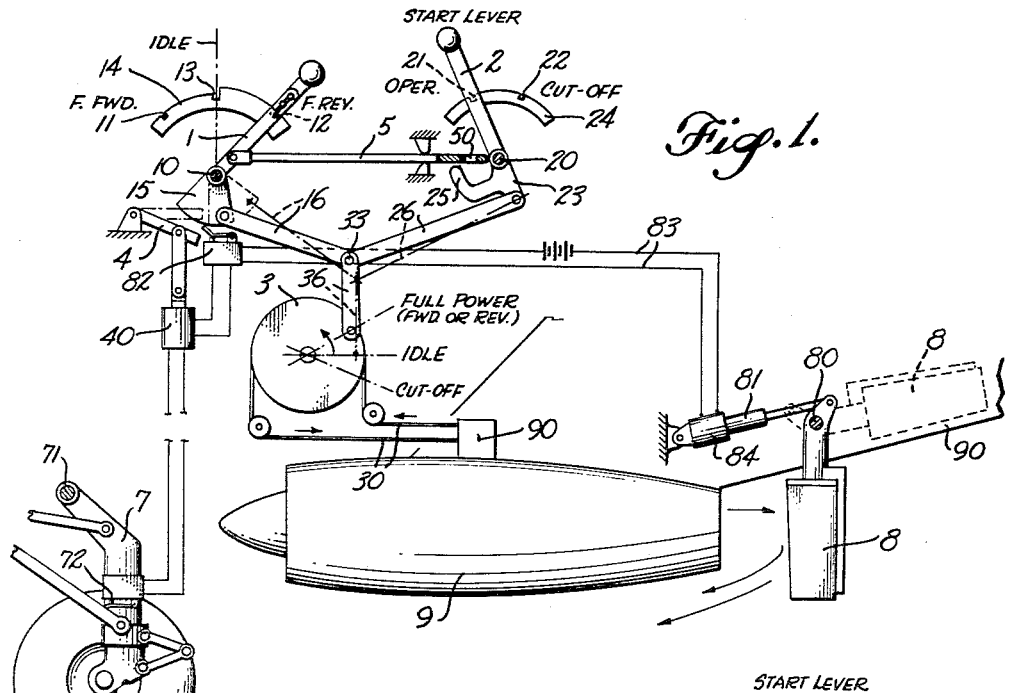
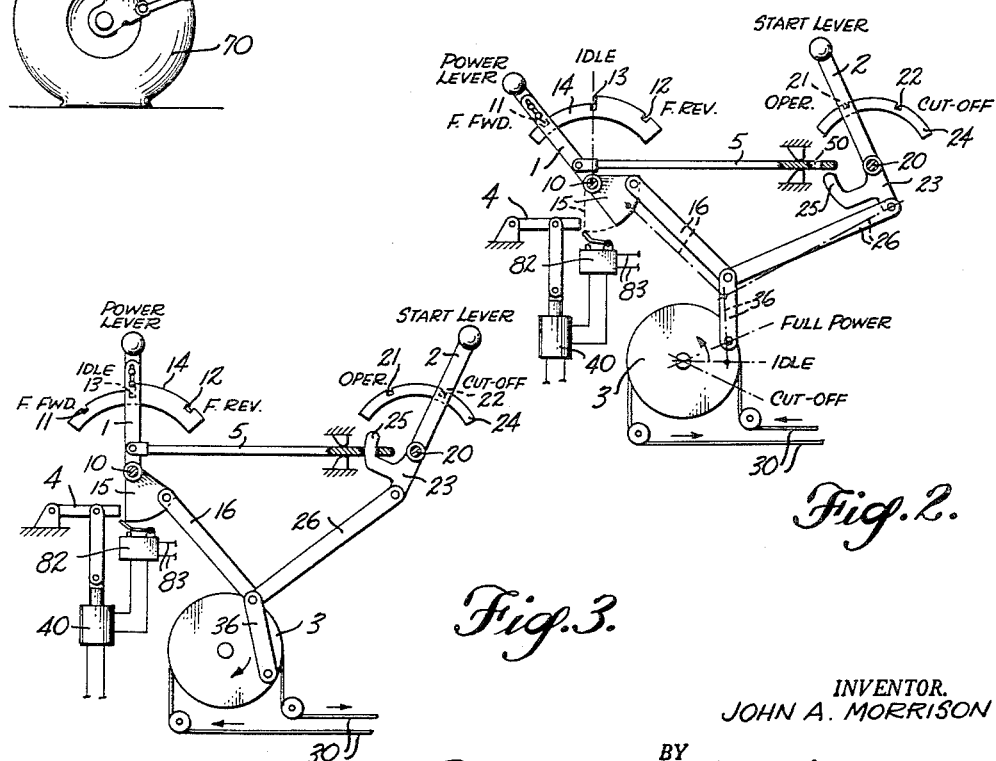
INVENTOR.
JOHN A. MORRISON
BY
Reynolds, Beach & Christensen
ATTORNEYS United States Patent Office 2,938,683
Patented May 31, 1960

2,938,683

POWER CONTROL MECHANISM FOR JET POWERED AIRCRAFT

John A. Morrison, Seattle, Wash., assignor to Boeing Airplane Company, Seattle, Wash., a corporation of Delaware Filed June 6, 1955, Ser. No. 513,319

10 Claims. (Cl. 244—81)

It is common in propeller-driven aircraft to provide mechanism which will bar the reversal of the pitch of the propellers until the aircraft is ground-borne. In jet-powered aircraft, reversal of thrust is commonly accomplished by jet-thrust-reversing devices which on touching down may be moved into operative relationship to the jet issuing from the engine's tailpipe, and which at other times may be maintained in a nonoperative position. In order to effect reversal of the thrust to the maximum extent possible, the engine must be run up to maximum thrust just as it would to develop maximum forward thrust, but this maximum thrust in conjunction with the thrust-reverser effects reversal of the thrust and slows down the forward progress of the aircraft.

In a reciprocating engine minimum fuel feed, attained by manipulation of the throttle lever, produces idling of the engine, but not stoppage thereof. Stoppage is accomplished by manipulation of a second control, the ignition switch, to break the ignition circuit. Deceleration of the forward run of the aircraft, after touching down, is accomplished by manipulation of still further controls. Because each function is controlled by a different control device, accidental operation of the wrong control is unlikely. In jet-powered aircraft, on the contrary, minimum fuel feed produces flame-out or stoppage, yet the lever that controls forward thrust should also control rearward thrust, but should be prevented from cutting the fuel supply at any time below a safe idling level. Some other control should be used to accomplish stoppage of the engine when required, so that such occurs only when intended, and not accidentally. Since both such controls affect the engine's throttle control mechanism, they must be so coordinated with the latter and with each other to insure against unintended or improper operation, under conditions unsuited for any given operation, yet to enable correct operation under proper conditions.

According to the present invention, there is provided a power control mechanism whereby operation of two levers in proper coordination is required to control the engine under all possible conditions, one of these being a power lever by which the thrust developed by the engine may be varied from idling either to full forward, if rotated in one sense, or to full reverse, if rotated in the opposite sense, but operation of the second lever, a start lever, is required to condition the engine, and the first lever, for normal operation either forward or reverse as explained above, or for cutting off the operation of the jet engine by reducing the fuel supply below the idling level. The two levers are so coordinated with each other, and with a throttle-control mechanism, as to achieve the above results automatically. In addition, controls are incorporated in the system as a whole to prevent movement of parts into the reversing position except when the aircraft is ground-borne, and also to prevent movement of the thrust-reversing device into reversing position until the aircraft is ground-borne, but then to accomplish its movement into operative position as a result of movement of the power lever towards reverse position, and as a prelude to developing full reverse thrust. Furthermore, as a safety device, there is an interconnection between the two levers, distinct from their operative interconnection, by means or which movement of the start lever from operating to cut-off position is prevented except during the time that the power lever is in its idle position.

By such provisions the control of thrust from the jet engine, whether in flight or on the ground, and for reversing, and the operation of the reversing device, is made as nearly as possible proof against inadvertent and undesirable movements of the controls, under existing conditions.

The general operational plan of the invention having been indicated above, it is believed that the invention will be best understood by describing a representative form as illustrated in the accompanying drawings, and as detailed in this specification hereinafter, and the principles of the invention which are believed to be new will be defined in the claims.

It should be made clear that the illustrations are diagrammatic and that the individual elements shown represent only one of various possible ways in which various operations and functions can be performed, and in which the several functions may be coordinated and controlled. The drawings, therefore, are to be looked on in the broad sense as illustrative and representative, rather than as restrictive.

Figure 1 is a diagrammatic illustration of the complete system, showing parts in the full reverse position and with the aircraft ground-borne.

Figure 2 is a similar diagram of a part of the mechanism, showing parts in the full forward position.

Figure 3 is a diagrammatic view similar to Figure 2, but showing parts now in the cut-off position.

Such an aircraft, as the invention is designed to be installed upon, would include on or more jet engines 9 supported from the aircraft structure (not shown) by means such as the depending strut 90 beneath a wing. To the rear of the engine's tailpipe a jet-thrust-reversing device 8 of suitable form might be associated with or built into the engine, but is herein shown as separate from the engine, pivotally mounted within the strut 90 at 80, so that it may be actuated by an electrically controlled jack or the like at 81 to swing downwardly into the full-line operative position of Figure 1, where the jet-thrust-reverser 8 intercepts and directs forwardly the jet issuing from the engine's tailpipe, into a dotted line nonoperative position, as also shown in that figure. The aircraft would, of course, be supported by suitable ground-contacting elements, such as the landing leg 7 mounting the wheel 70, and usually pivotally mounted at 71 upon the aircraft structure for retraction and extension. The landing leg, as usual, would incorporate two relatively telescoping elements in association with the usual shock absorber, and the relative telescoping movement of these elements would be depended upon to actuate or close a squat switch 72 or the like, as is known in the art, when the aircraft is ground-borne.

Throttle-control mechanism for the engine 9 is diagrammatically illustrated at 98. The precise nature of the same is immaterial so far as the present invention is concerned. However, it is assumed to be of a type that may be moved to increase or to decrease the fuel supply to the engine between zero and a maximum limit by means of a throttle-control device including a rotative element 3, shown herein as a pulley wheel. Between the element 3 and the throttle control 90 is an operative connection indicated by the cables 30.

Mounted upon the aircraft structure conveniently to the pilot or the flight engineer is a power lever 1, the same being pivoted at 10 to rock to the left and to the right, as viewed in the drawings, from an idle position 13, indicated in dot-dash lines in Figure 1, either in one sense to the full forward position indicated at 11 on a quadrant 14, or in the opposite sense to a full reverse position, indicated at 12. The quadrant would ordinarily have a step at the idle position, such as would require manipulation of the lever in order to pass the step in the reverse sense. Such provisions are common in such control levers. In addition, the power lever is provided with a concentric cam 15 which swings with the power lever. A start lever 2, distinct from the power lever, is pivotally mounted at 20 to swing with relation to a quadrant 24 between an operating position 21 and a cut-off position 22.

These two levers, 1 and 2, are operatively interconnected with each other and with the rotative element 3 of the throttle-control device by a suitable arrangement, typified by the linkage arrangement shown. The link 16 may be termed, for convenience of reference, the first link, the link 36 a second link, and a link 26 a third link. The link 16 is connected at one end to the power lever 1, or to the cam extension 15 of the latter; the link 36 is connected at one end to the rotative element 3 of the throttle-control device; and the link 26 is connected at one end to the start lever 2, or to the extension 23 thereof. The three links 16, 26 and 36 are connected together at a common pivot point, indicated at 33.

Again, it is to be emphasized that the mechanism thus described in detail is merely representative of various mechanisms that might be employed to the end in view, and that the invention consists primarily in the interconnection and intercontrol between the several mechanisms, and the particular form of the mechanism illustrated is only a secondary feature of this invention.

To complete the description of the mechanism diagrammatically shown, the stop 4 will be so positioned in flight as to block swinging of the power lever 1 from its idle position toward its full reverse position, this being in addition to the blockage afforded by the step at 13. This stop 4 is automatically controlled, as by a solenoid 40 in circuit with the squat switch 72, so that the stop 4 may not be withdrawn from the path of the power lever 1 until the aircraft is fully ground-borne. When the aircraft is ground-borne, however, and the squat switch 72 is closed, the withdrawal of the stop 4 is automatic, either as a result of closure of the squat switch alone or as a result of closure also of the switch 82, described below.

The switch 82 has an actuating element positioned to be engaged by the cam 15 of the power lever 1 when the latter moves from its idle position towards its full reverse position. The switch 82 will usually be so located that it can not be closed until the stop 4 has been withdrawn, and movement of the power lever from its idle toward its full reverse position has been initiated. It might be so located, however, as to be closed by the initial movement of the lever 1 towards its reverse position. When the switch 82 is closed, it being in circuit with the squat switch 72 and the solenoid 40, a circuit is closed by way of 83 to the electric control 84 for the actuator 81, and in conjunction with initiation of movement of the power lever 1 toward its full reverse position (which because of blockage by the stop 4 can occur only after the aircraft is fully ground-borne), the jet-thrust-reversing device 8 is moved into operative relationship to the tailpipe of the engine 9. Conversely, its return to nonoperative (dashline) position is automatically accomplished by return of the power lever 1 to its idle position, wherein switch 82 is reopened.

If it be assumed that the power lever 1 has been in its idle position 13, and that the aircraft has become ground-borne, but is rolling forwardly at relatively high speed, movement of the power lever 1 to the right or toward its full reverse position 12 not only moves the jet-thrust-reversing device 8 into operative position, but runs up the motor toward or to full thrust. However, since this thrust now reacts from the jet-thrust-reversing device 8, the forward progress of the aircraft is slowed to the extent desired. In accomplishing this end, it is clear that the link 16 is moved from the dot-dash position of Figure 1, wherein the link 16 is in line with the pivots 10 and 33, into the full-line position of Figure 1, but since the outer end of the link 26 is held stationary, link 26 functions only to retain the first and second links 16 and 36 in relative dog-leg disposition, and the rocking of the power lever 1 causes rotation of the throttle-control element 3 from the idle position to the full power position, which represents full power either forward or reverse. It is equally clear that so long as the third link 26 has its outer end fixed, it is impossible for the throttle-control element 3 to be rotated from the idle position clockwise toward the cut-off position.

Figure 2 will show that rotation of the power lever from the idle position to the full forward position will, in exactly the same manner and to the same extent, rotate the throttle control element 3 in the same sense as it was rotated in Figure 1 to effect full reverse. In Figure 2, however, the stop 4 remains in the path of the power lever 1 and the latter can not be rotated in the sense toward its reverse position 12, nor can the switch 82 be closed to effect movement of the jet-thrust-reversing device 8 to its operative from its nonoperative position, since the squat switch 72 remains open, the aircraft being air-borne.

The start lever during all operation remains in the "operating" position, but when operation is ended, it is its movement to "cut-off" position that closes down the engine. This must occur only when the engine is idling. There is, as has been stated above, an interconnection between the power lever 1 and the start lever 2 that bars movement of the start lever to cut-off position except when the power lever has moved to and is in its idle position. To this end a link 5 is pivoted at its one end to the power lever 1 to move with the latter, and the link 5 is suitably guided so that its opposite end moves, in conjunction with the power lever 1, in the vicinity of the start lever 2. This latter end of the link 5 is provided with means, such, for instance, as the aperture 50, and the start lever 2 is provided with cooperating means, such as the horn 25, which will pass through the aperture 50, but only when the aperture is in a position corresponding to the idle position of the power lever 1. At all other times the link 5 bars swinging of the start lever 2 from its operating position. The position of parts for cut-off is shown in Figure 3. Here the power lever 1 is in its idle position, the horn 25 is in registry with and has entered the aperture 50 of the link 5, and the start lever 2 has been rotated to the right, or clockwise, from the operating position 21 to the cut-off position 22. By thus requiring the use of a separate lever from that used for normal control of the throttle, to effect cut-off of the engine, and by making that movement possible only when the engine's normal throttle control is in idle, it is assured that the engine will only be cut off when that is intended, and when the operation of the engine is proper for cut-off.

To effect cut-off, it is clear that the outer end of the first lever 16 is held stationary by the fixation of the power lever 1 in its idle position at 13 and consequently rotation of the start lever 2 to the right reacts through the third link 26 and the second link 36, which again are held normally in dog-leg disposition, to effect rotation of the throttle-control element 3 from its idle position in the sense oppositely to its movement toward full power position, or into cut-off position.

The operative connection between the two levers might vary from that shown, and it is clear that if the power lever 1 were the sole connection to the throttle-control element 3, the start lever 2 might still be connected to the cables 30 in a way that swinging of the start lever toward cut-off position would vary the relative position of the two runs of the cable, and so effect rotation at the throttle control 90 in the proper sense to effect cut-off.

I claim as my invention:

1. Power control mechanism for a jet engine for propulsion of an aircraft, such as includes jet-thrust-reversing means, said power control mechanism including a throttle control device for operative connection to the engine and shiftable in one sense from an idle position to a full power position, and in the other sense from such idle position to a cut-off position; a first pilot's control element shiftable in one sense between an idle position and a full forward position, and in the other sense between that idle position and a full reverse position; a second pilot's control element shiftable between an operating position and a cut-off position; means interconnecting each control element with the throttle control device, and cooperating to shift the latter according to the relative positions of the two pilot's control elements, said first element and its interconnecting means being arranged to withhold the throttle control device from movement beyond its idle position towards its cut-off position so long as the second element and its interconnecting means are in their operating position; and the second element and its interconnecting means being arranged to effect movement of the throttle control device from its idle position to its cut-off position while the first element and its interconnecting means are in their idle position.

2. Power control mechanism as in claim 1, including auxiliary means interconnecting the two pilot's control elements, and shiftable with the first thereof, arranged to bar movement of the second thereof from its operating position except as the first thereof is in its idle position.

3. Power control mechanism for a jet engine for propulsion of an aircraft, such as includes jet-thrust-reversing means, said mechanism including a throttle control device for operative connection to the engine and shiftable between a full power position through an idle position to a cut-off position; a first pilot's control element shiftable from an idle position in either of two senses to full forward and full reverse power positions, respectively; a second pilot's control element shiftable between an operating position and a cut-off position; an operating connection from each of said pilot's control elements to said throttle control device, whereby each such element controls the movement of the other; the operating connection from the first pilot's control element including an articulated linkage mechanism which passes through an in-line position, so long as the second pilot's control element is in operating position, as that first element moves in either sense through its idle position; and the operating connection from the second pilot's control element including means to shift such articulated linkage mechanism from its in-line position, corresponding to "idle" of the first element, towards cut-off position, by movement of the second element from its operating to its cut-off position, and thereby to shift the throttle control device to its cut-off position, so long as the first pilot's control element is in its idle position.

4. Power control mechanism as set forth in claim 3, including an interconnection between the first and the second pilot's control elements, shiftable with the first thereof, and positioned relative to the second thereof to block shifting of the latter from its operative position except as the first element is in its idle position.

5. Power control mechanism as set forth in claim 3, for an aircraft having resilient landing gear, said power control mechanism including means for operative connection to the jet-thrust-reversing means to move the latter into its reversing position, said means being positioned for actuation by shifting of the first pilot's control element from its idle position towards its reverse position, means barring such movement of said first element, and means for operative connection to the landing gear, operatively connected to said barring means to disable the latter and so to enable shifting of the first element towards reverse position, upon compression of the landing gear by ground engagement thereof.

6. Power control mechanism for a jet engine for propulsion of an aircraft, said power control mechanism including a throttle control device for operative connection to the engine and shiftable between a full power position through an idle position to a cut-off position, and the reverse; a first lever shiftable between an idle position and a full power position; an operating connection between said first lever and said throttle control device to shift the latter between its idle position and its full power position by corresponding movement of the first lever; a second lever shiftable between an operating position and a cut-off position; an operating connection between said second lever and said throttle control device to shift the latter between its idle position and its cut-off position by corresponding movement of the second lever; and means interengageable between the first and second levers to bar movement of the second lever from its operating position towards its cut-off position until the first lever is in its idle position.

7. Power control mechanism for installation in an aircraft powered by a jet engine and provided with jet-thrust reversing means movable into and from reversing position, said power control mechanism comprising a power lever pivotally movable to either side of an idle position into full forward and full reverse positions, respectively, means for operatively connecting said power lever to the thrust-reversing means to move the latter into reversing position upon movement of the power lever towards its reverse position, and vice versa, a start lever pivotally movable between an operating and a cut-off position, an oscillatable throttle control element having means for operative connection to the engine's throttle, and oscillatable from an idle position in one sense to a full power position, and in the opposite sense to a cut-off position, a first link connected to said power lever and a second link connected to the throttle control element, and pivotally connected to the first link to maintain the latter in relative dog-leg disposition, whereby to maintain said first link in radial alignment with the power lever so long as the throttle control element remains in its idle position, and a third link connected to swing with the start lever, and to the common pivot of the two previously-mentioned links, to effect movement of the second link and the throttle control element from idle towards cut-off position by corresponding movement of the start lever, so long as the power lever remains in its idle position.

8. Power control mechanism as in claim 7, including a cam swingable with the power lever, an actuator for operative connection to the thrust-reversing means, located for engagement by said cam, to be shifted and retained in energized position, upon movement of the power lever beyond its idle position towards its reverse position, means located to bar such movement of the power lever, and means operable only while the aircraft is ground-borne to disable said barring means.

9. Power control mechanism as in claim 7, including a link connected to move with the power lever and extending between the latter and the start lever, said link and the start lever having means interengageable to bar movement of the start lever from its operating position towards its cut-off position except while the power lever is in its idle position.

10. Power control mechanism for installation in an aircraft powered by a jet engine and provided with jet-thrust reversing means movable into and from reversing position, said power control mechanism comprising a power lever shiftable to either side of an idle position to full forward and full reverse positions, respectively, an operative connection extending from said power lever to the thrust-reversing means, for connection to the latter, and arranged when so connected to move the latter into reversing position upon movement of the power lever from its idle position towards its reverse position, and vice versa, a start lever shiftable between operating and cut-off positions, a throttle control device including an oscillatable element for operative connection to engine's throttle, said oscillatable element being shiftable from an idle position in one sense to a full power position, and in the opposite sense to a cut-off position, a first link connected at one end to the power lever, a second link connected to the oscillatable element of the throttle control device, and a third link connected at one end to the start lever, the first and third links being pivotally connected and of a length to remain, in most relative positions of the corresponding levers, in obtuse-angled relationship, and only to approach acute-angled relationship by movement of the power lever to its idle position and the start lever at the same time to its cutoff position, the second link being connected to the common pivot of the first and third links, and the oscillatable element of the throttle control device being located, relative to the first and third links, that the second link substantially bisects the angle between the first and third links, and is moved thereby to shift said oscillatable element between its full throttle position and its idle position so long as the first and third links remain in their obtuse-angled relationship, and to shift said oscillatable element from its idle position towards its cut-off position upon movement of the first and third levers towards their acute-angled relationship.

References Cited in the file of this patent

UNITED STATES PATENTS

| | | |
|---|---|---|
| 1,694,220 | Jenkins | Dec. 4, 1928 |
| 2,331,108 | De Ganahl | Oct. 5, 1943 |
| 2,696,079 | Kappus | Dec. 7, 1954 |